(12) United States Patent  
Deane

(10) Patent No.: US 6,497,518 B1
(45) Date of Patent: Dec. 24, 2002

(54) MINIATURE OPTO-ELECTRONIC TRANSCEIVER

(75) Inventor: Peter Deane, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 18 days.

(21) Appl. No.: 09/713,367

(22) Filed: Nov. 14, 2000

(51) Int. Cl.[7] ............................ G02B 6/36; H04B 10/00
(52) U.S. Cl. ............................ 385/92; 385/88; 385/14; 359/152
(58) Field of Search ............................ 385/88, 89, 92, 385/93, 94, 139, 76, 77, 78, 80, 49; 359/152, 154

(56) References Cited

U.S. PATENT DOCUMENTS

| | | | | |
|---|---|---|---|---|
| 5,011,246 A | * | 4/1991 | Corradetti et al. | 385/53 X |
| 5,487,124 A | * | 1/1996 | Bowen et al. | 385/93 |
| 6,201,704 B1 | * | 3/2001 | Poplawski et al. | 361/753 |
| 6,305,848 B1 | * | 10/2001 | Gregory | 385/53 |
| 6,318,909 B1 | * | 11/2001 | Giboney et al. | 385/90 |

* cited by examiner

Primary Examiner—Brian Healy
(74) Attorney, Agent, or Firm—Beyer Weaver & Thomas LLP

(57) ABSTRACT

An opto-electronic transceiver assembly comprising a socket for receiving an optical transmission medium and a securing structure for receiving an opto-electronic device. The socket and securing structure are designed so that the optical transmission medium and the opto-electronic device become connected upon receipt by the sleeve device. The sleeve device may then be securely attached to a printed circuit board. In an alternative embodiment, the securing structure is a receiving slot into which the opto-electronic device may be inserted. In yet another alternative embodiment, the receiving slot includes a support shelf which supports and which is thermally coupled to the opto-electronic device.

24 Claims, 9 Drawing Sheets

MINIATURE OPTO-ELECTRONIC TRANSCEIVER

FIELD OF THE INVENTION

The present invention relates generally to opto-electronic devices, and more specifically to the packaging of opto-electronic devices.

BACKGROUND

Most computer and communication networks today rely on copper wiring to transmit data between nodes in the network. Since the data transmitted over the copper wire and the data processed within the nodes are both represented in the form of electrical signals, the transfer of data at the node-copper wire interface is straight forward. Other than perhaps level shifts and signal amplification, no other signal processing is required for data transmitted over the copper wire to be decoded by the node. The drawback with using copper wire is its relatively low bandwidth. Copper's ability to transmit data is significantly limited compared to other mediums, such as fiber optics. Accordingly much of the computer and communication networks being built today, including the Internet, are using fiber optic cabling instead of copper wire.

With fiber optic cabling, data is transmitted using light signals, rather than electrical signals. For example, a logical one may be represented by a light pulse of a specific duration and a logical zero may be represented by the absence of a light pulse for the same duration. In addition, it is also possible to transmit at the same time multiple colors of light over a single strand of optic fiber, with each color of light representing a distinct data stream. Since light is attenuated less in fiber than electrons traveling through copper, and multiple data streams can be transmitted at one time, the bandwidth of optic fiber is significantly greater than copper.

While fiber optic data transmission has proven very efficient, substantial problems have been encountered when applying these light signals to process data. Transferred data is typically stored in various locations before, during and after it is processed by a computer. Since there is currently no efficient technique to "store" these light packets of data, networks will likely continue to use fiber optics for transmitting data between nodes and silicon chips to process the data within the nodes for the foreseeable future. Building such networks requires opto-electronic transceivers, which connect optical transmission devices to electronic computing devices through devices that transform optical signals to electronic signals, and vice-versa.

Ideally, such opto-electronic transceivers should provide secure and reliable connections between the various devices and should be compact in size. Secure connections ensure that the individual devices do not disconnect and therefore cause a failure in the opto-electronic transformation process. Compactly sized transceiver modules allow a higher density of optical fibers to be attached to an electronic printed circuit board, thereby increasing the bandwidth available to the computing system.

One current opto-electronic transceiver design 50 is illustrated in FIG. 1. The transceiver 50 is composed of four main sub-assemblies, which attach to each other through pins 15 that extend through each sub-assembly. The bottom sub-assembly is typically a plastic base 10, which establishes a base upon which the optical sub-assembly 20, the electronic sub-assembly 30 and the case 40 are mounted. The assembled transceiver 50, through the base 10, is generally attached to a printed circuit board (not shown). Moreover, the base 10 provides a socket 16 formed for sliding receipt of an end connector of an optical fiber transmission line (not shown). When the end connector of the fiber optic line is received in socket 16 of the base 10, the optical fibers thereof are communicably coupled to the optical detector and transmitters of the optical sub-assembly 20. The electrical sub-assembly 30 contains an electronic semiconductor chip operably coupled to the detector and transmitters. The metallic case 40 provides protection to the optical and the electrical sub-assemblies 20, 30 by enclosing them within the connector.

While the transceiver design adequately ensures a secure connection between optical and electronic devices, assembly of its individual sub-assemblies is mechanically complex. Moreover, the end connectors of the fiber optic lines are often subjected to constant load forces. Over time, these plastic housings 10 tend to fatigue and fracture. Another problem associated with the current arrangements is that the opto-electronic components within the casing 40 are usually thermally isolated. This is disadvantageous in that current opto-electronic component designs often generate large amounts of heat. Thus, increased heat dissipation is required to maintain the laser temperature within acceptable limits. Finally, the size of transceiver 50 limits the achievable fiber density upon printed circuit boards. For example, current fiber densities along the edge of printed circuit boards can only support up to approximately twelve (12) fibers per 20 mm.

In view of the foregoing, a simple and compact opto-electronic transceiver capable of providing secure connections between optical and electronic devices would be desirable.

SUMMARY

The present invention is directed to a compact opto-electronic transceiver assembly capable of securely connecting optical and electronic devices. The opto-electronic transceiver includes a sleeve device with a socket for receiving an optical transmission medium and a securing structure for receiving an opto-electronic device. The socket and securing structure are designed so that the optical transmission medium and the opto-electronic device become connected upon receipt of the connector by the sleeve device. The transceiver may be securely attached to a printed circuit board.

In an alternative embodiment, the securing structure is a receiving slot into which the opto-electronic device may be inserted. In yet another alternative embodiment, the receiving slot includes a support shelf which supports and which is thermally coupled to the opto-electronic device.

These and other features and advantages of the present invention will be presented in more detail in the following specification of the invention and the accompanying figures which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
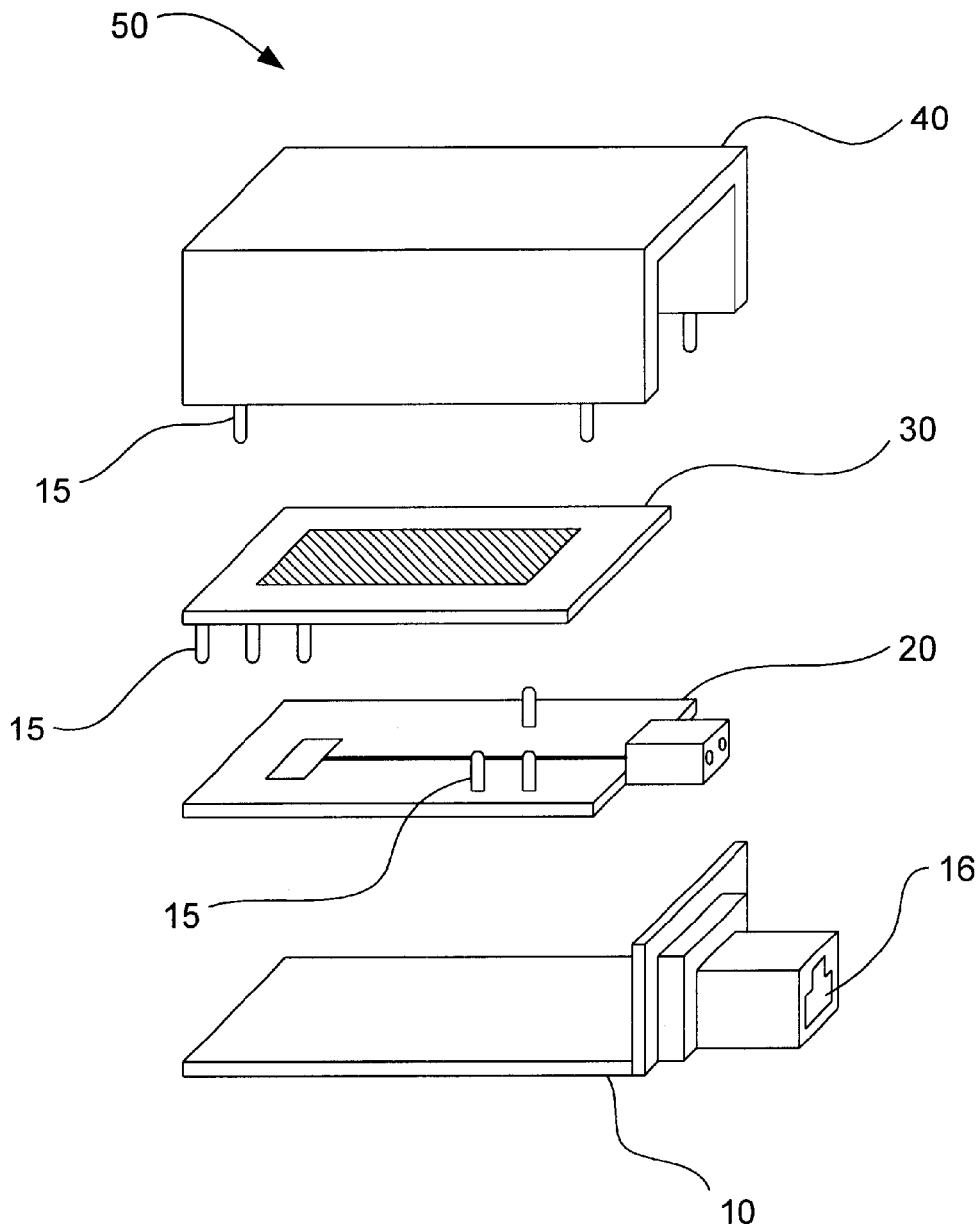
FIG. 1 illustrates an exploded perspective view of a prior art opto-electronic module.
Figure 2:
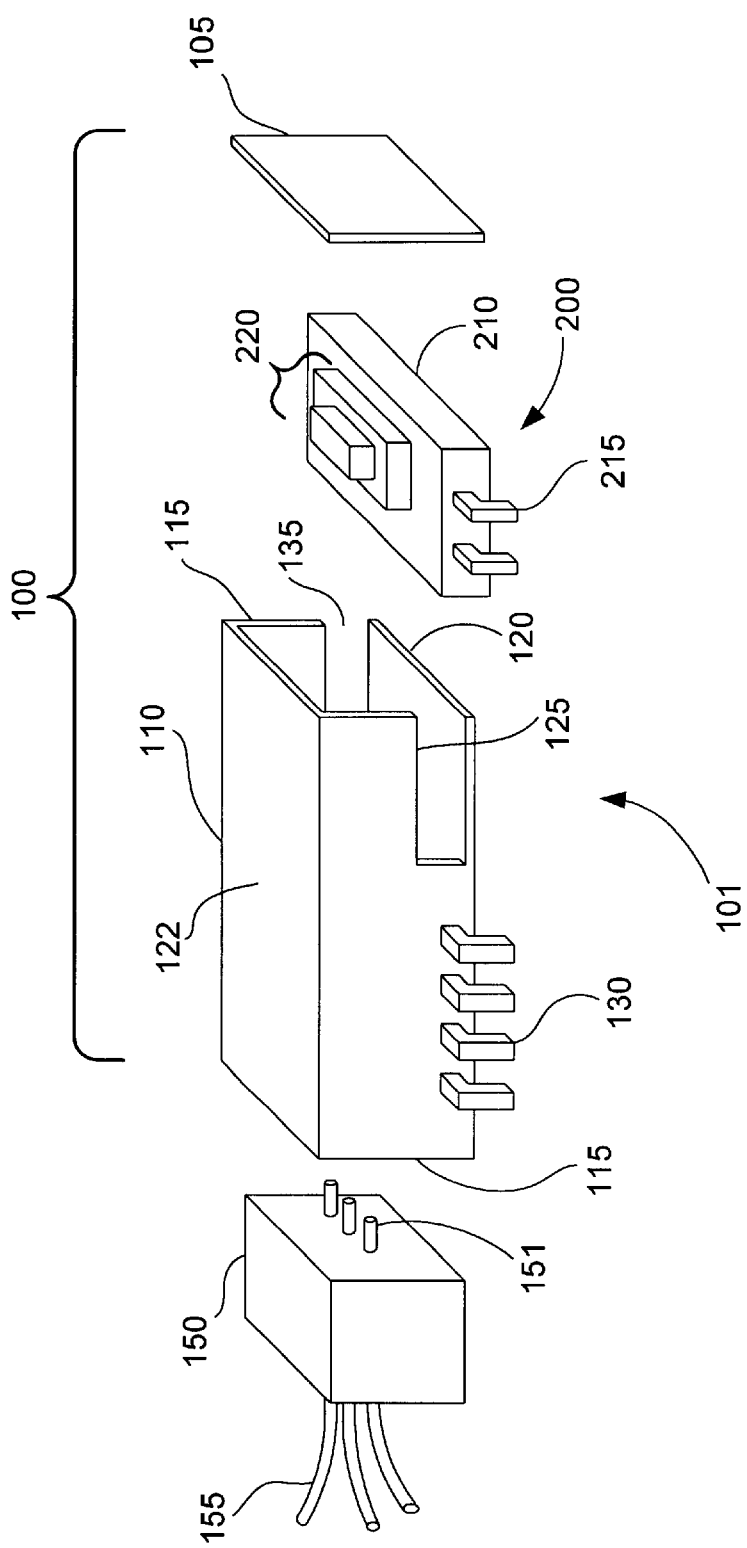
FIG. 2 illustrates an exploded front perspective view of an opto-electronic module according to one embodiment of the present invention.
Figure 7:
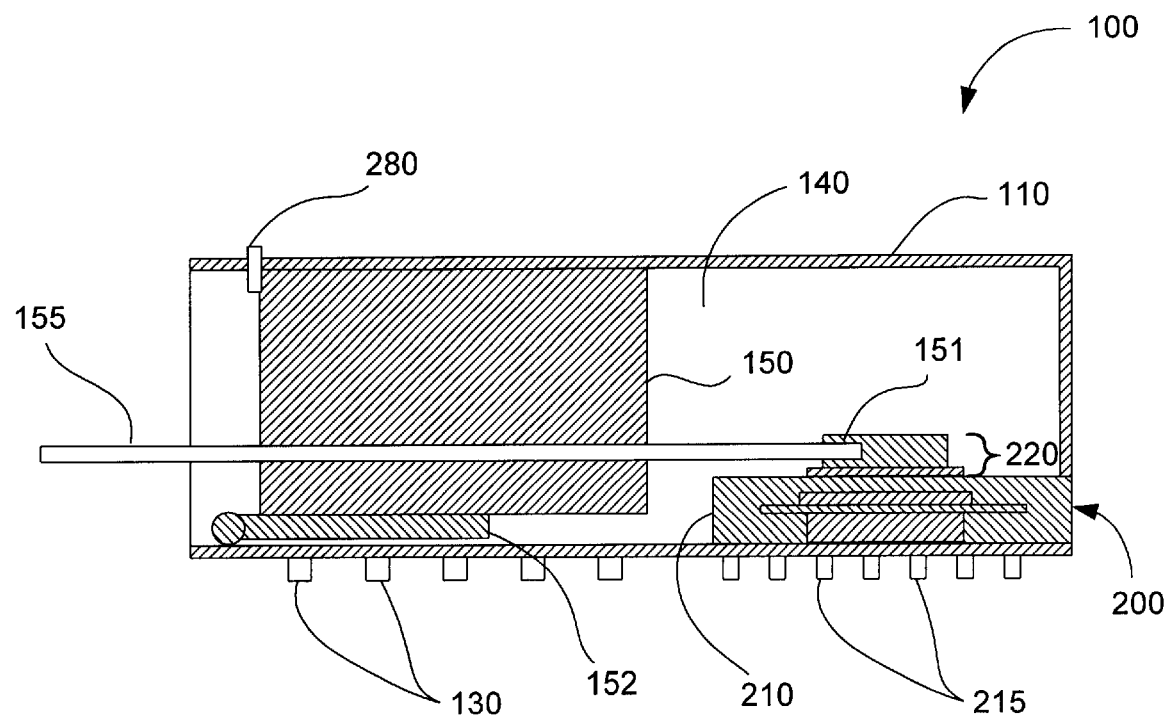
FIG. 7 is a side elevation view, in cross-section, of the opto-electronic module of FIG. 6, having an opto-electronic device and an optical connector device secured thereto.
Figure 8:
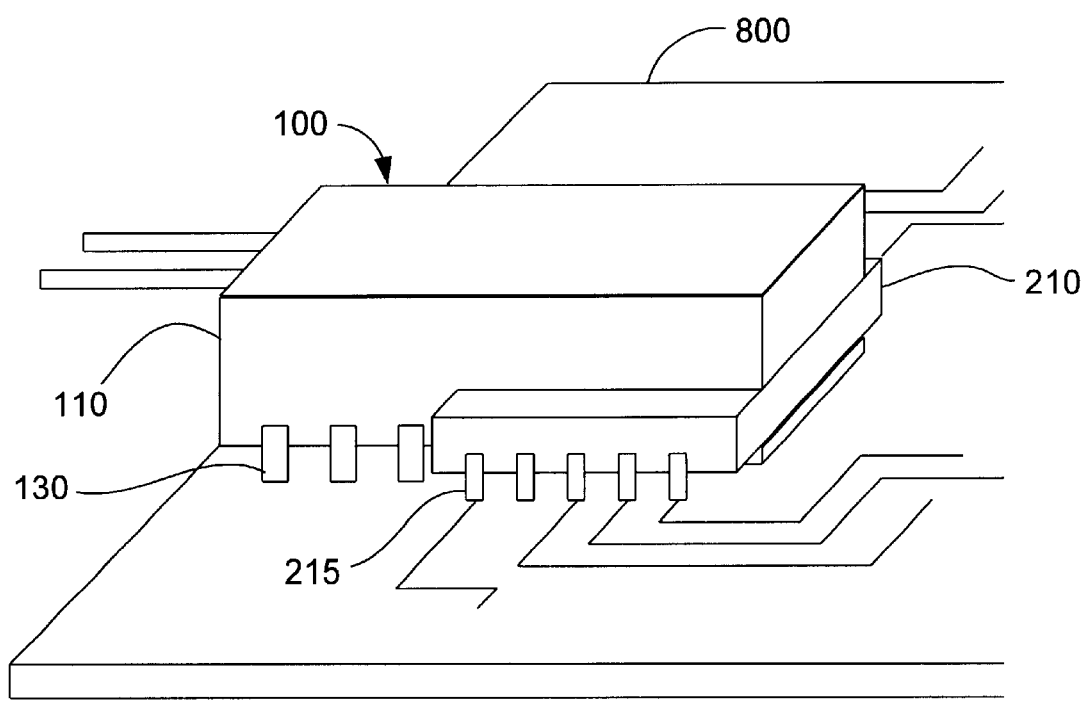
FIG. 8 illustrates a front perspective view of an opto-electric assembly that is connected to a printed circuit board.

Referring now to FIGS. 2, 7 and 8, the present invention is directed towards an optoelectric transceiver assembly, generally designated 100, which operably and securely connects an optical transmission device 150 (preferably an end connector device of an optical transmission line 155) to an opto-electronic device 200. More specifically, the transceiver assembly 100 operably aligns and connects distal tips 151 of optical fiber line 155 to an optical receiver or module 220 of the opto-electronic device 200. Briefly, the transceiver assembly 100 includes a relatively rigid sleeve device, generally designated 110, having a securing structure 101 adapted to rigidly mount the sleeve device to the opto-electronic device 200 in a manner substantially preventing relative movement therebetween. Preferably, this mount is to the rigid semiconductor package 210 of the opto-electronic device 200. The sleeve device 110 further defines a socket 140 sized for aligning receipt of the optical transmission connector device 150 therein for optical coupling to the opto-electric device 200. Mounting stems 130 cooperate with the sleeve device 110 to mount the sleeve device and the opto-electronic device 200 to the substrate 800, as a unit.

Accordingly, the present invention provides a transceiver assembly, which substantially increases the mounting integrity of the transceiver assembly to the substrate. As will be described in greater detail below, this is primarily performed by rigidly mounting the semiconductor package of the opto-electric device to the rigid sleeve device, and then mounting both components to the substrate as a unit. Consequently, the sleeve device and the opto-electric device structurally respond as a single, integral unit so that the loads placed upon the transceiver assembly by the optical transmission devices are easily accommodated and transferred to the substrate.

Figure 3:
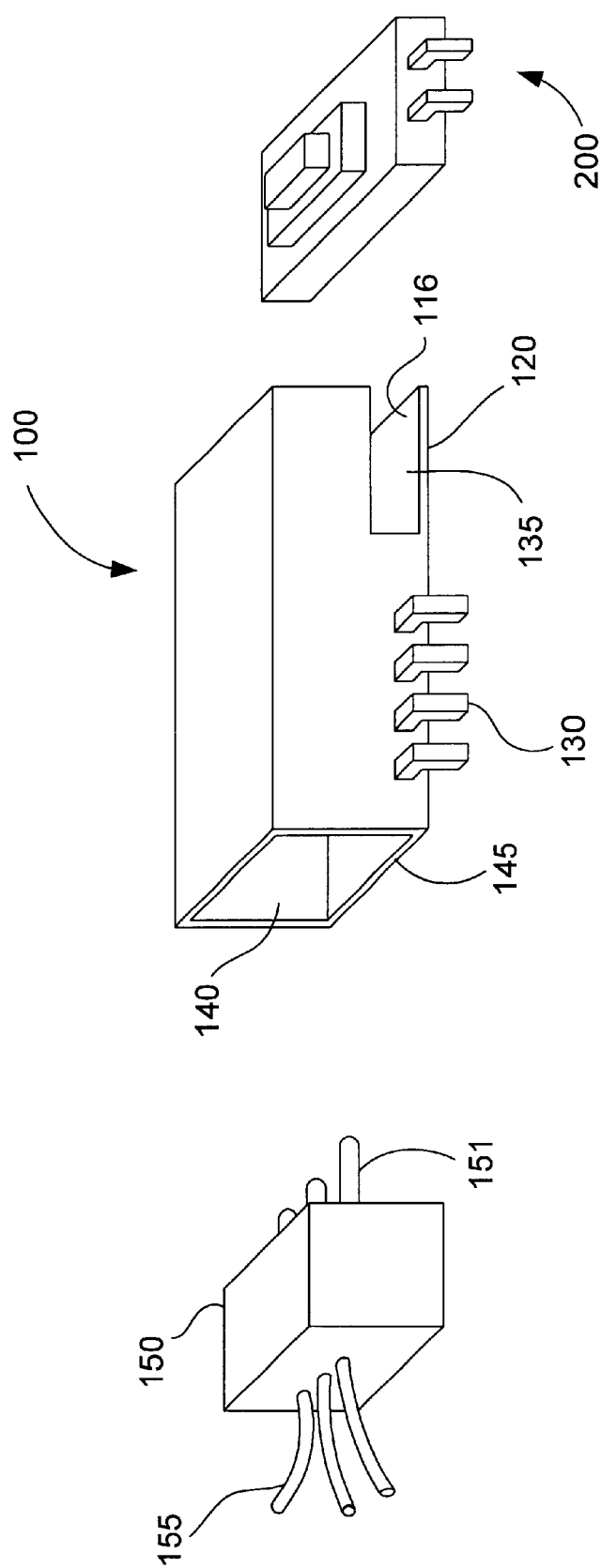
FIG. 3 illustrates a rear perspective view of the opto-electronic module according to one embodiment of the present invention prior to insertion of an optical connector device into a socket of the module.

As best illustrated in FIGS. 2 and 3, the relatively rigid sleeve device 110 is composed of a metallic thin shell-shaped structure adapted for receipt of both the opto-electronic device 200 and the connector device 150. The sleeve device 110 generally is rectangular in shape, and includes a bottom support shelf 120, an opposed pair of upstanding side walls 115 and a top support shelf 122. On one end of the device 110 is an opening 145 into the socket 140 which is formed and dimensioned for sliding receipt of a transverse cross-sectional dimension of the connector device 150 therein. This snug sliding fit enables the connector device 150 to be secured within the socket 140 (see FIGS. 3 and 7), and provides a proper optical alignment between the optical components during interconnection. Briefly, the optical connector device 150 includes the optical fiber line 155 having a distal tip portions 151 threaded through the connector device 150. When the connector device 150 is inserted into the socket 140 of the sleeve device 110, the connector device is aligned to position the distal tip portions 151 of the optical fiber 155 into the optical module 220 of the opto-electronic device 200. It should be appreciated that the sleeve device 110 may be composed of materials other than metal. Generally, various heat conductive materials would also be appropriate.

Further, the opto-electronic device 200 is formed by stacking the optical module 220 on top of the semiconductor package 210. These devices have standardized form factors, such as small outline packages (SOP), shrink small outline packages (SSOP), thin small outline package (TSOP), pin grid arrays (PGA), and various laminate chip scale packages. Electrical contacts provided on top of the semiconductor die, within the package, connect the die with the optical module. Chip scale packages may include leadless leadframe packages. Solder balls may be used to connect the electrical contacts of the leadless leadframe packages to the contacts on an electrical substrate. For further description relating to such opto-electronic device designs, refer to U.S. application Ser. No. 09/568,094 ("Device and Method for Providing a True Semiconductor Die to External Fiber Optic Cable Connection") and 09/568,558 ("An Arrayable, Scalable and Stackable Molded Plastic Package Configuration"), both of which are herein incorporated by reference.

Figure 4:
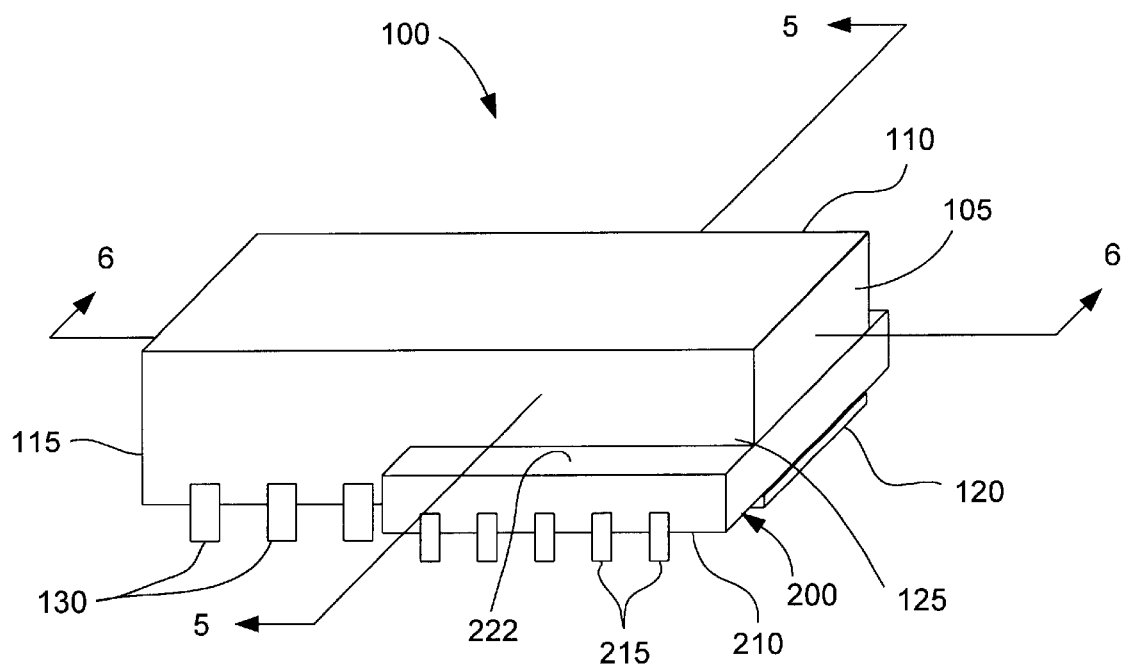
FIG. 4 illustrates a front perspective view of the opto-electronic module of FIG. 1 that has been assembled.
Figure 5:
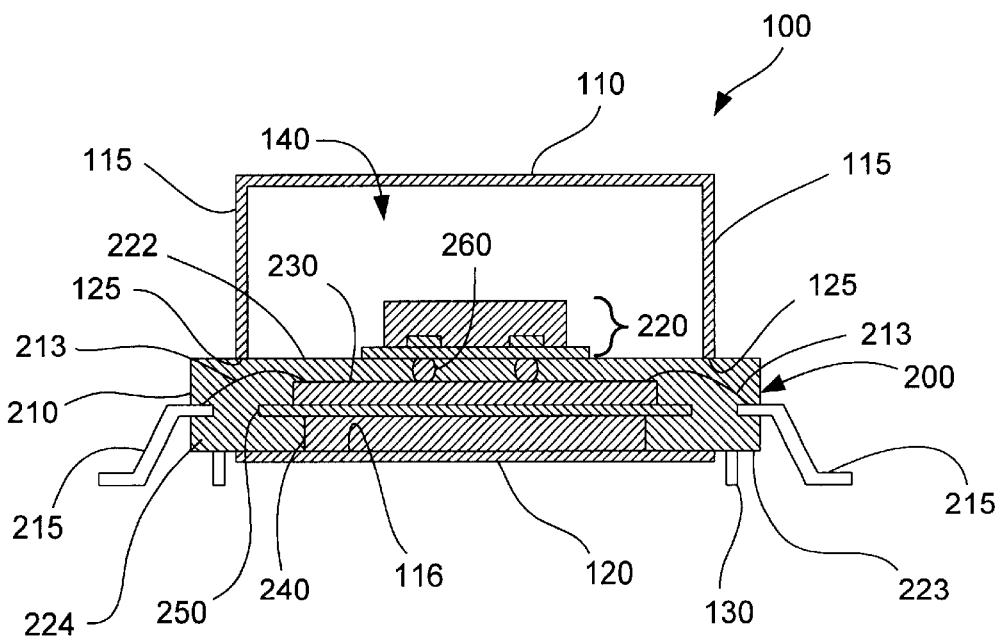
FIG. 5 illustrates an enlarged, front elevation view, in cross-section, of the opto-electronic module taken substantially along a vertical plane of the line 5—5 in FIG. 4.

As above-indicated, to secure and support the opto-electronic device 200 to the sleeve device 110, securing structure 101 is included. As shown in FIGS. 2 and 4–6, this securing structure includes a receiving slot 135 in each side wall 115 extending inwardly from an opposite end of the sleeve device. The receiving slots 135 are preferably rectangular in shape, and are formed for sliding receipt of the semiconductor package 210 of the module therein. Each slot 135 is defined by downward facing shoulder portion 125 of each sidewall 115, and an upward facing surface 116 of the support shelf 120. As can be seen in FIGS. 4 and 5, the shoulder portions 125 of the sidewalls 115 extend substantially adjacent and parallel to the upper surface 222 of the semiconductor package 210. The shoulder portions 125 serve to maintain the opto-electronic device 200 in a flat orientation with respect to the support shelf 120. Therefore, when the opto-electronic device 200 is inserted into the slot 135, the semiconductor package 210 is vertically braced through supportive contact of the semiconductor package upper surface 222 with the shoulder portions 125 of the side walls 115, and of the semiconductor package lower surface 223 with the upward facing surface 116 of the support shelf 120.

In addition to the friction fit of the semiconductor package in the receiving slots of the sleeve side walls, the securing structure may further include an adhesive material applied at these contact points. Examples of suitable adhesives include solder and epoxy. Alternatively, any conventional fastener may be applied.

Through the relatively rigid mount of the opto-electronic device 200 to the sleeve device 110, the overall structural integrity of the transceiver assembly 100 is significantly strengthened. Consequently, this assembly will physically respond as substantially a one-piece component when subjected to loads by the optical transceiver device. This is advantageous since the alignment between the optical connector device 150 and the optical module 220 can be better maintained.

As shown in FIG. 2, a front panel 105 may be removed from the sleeve device 110 to provide sufficient space for the opto-electronic device 200 to be inserted into the slot 135 since the optical module 220, which extends from the top surface of the semiconductor package 210, would contact front panel 105. The front panel 105 may then be reattached to sleeve device 110 after the opto-electronic device 200 is inserted. In alternative embodiments, only a portion of the front panel that is sufficient to allow the optical module to pass through the front panel of the sleeve device need be removed or altogether excluded.

To further increase the structural integrity of the transceiver assembly 100, both the sleeve device 110 and the opto-electronic device 200 are attached to the PCB 800 (FIG. 8). This is performed by providing a plurality of mounting tabs or stems 130 on both sides of the base of the sleeve device 110 which can be soldered to the PCB similar to contact leads. Thus, while the electrical contact leads 215 of the opto-electronic device 200 are connected to the input/output terminals or circuits of PCB 800, the mounting stems 130 serve to provide additional strength to the connection of the opto-electronic device 200 to the printed circuit board. The strength of the connection to the PCB, thus, is substantially improved. This sleeve device 110 is capable of withstanding such forces up to approximately ten (10) Newtons.

Accordingly, the transceiver assembly of the present invention is particularly suitable for "edge-launch" applications. Since the overall footprint of the transceiver assembly 100 can be reduced, fiber density along the along the edge of a PCB 800 can be increased. This sleeve device, for instance, allows for a fiber density of approximately 12 fibers per 8–10 mm. It should be appreciated by those of ordinary skill in the art that the fiber densities achievable will increase as semiconductor and optical technologies advance and miniaturize component sizes.

In another aspect of the present invention, the rigid mount of the metallic case of the sleeve device 110 to the opto-electronic device 200 has substantial thermal and EMI screeing benefits as well. More particularly, by thermally coupling the sleeve device 110 to the semiconductor package 210, heat can be dissipated through the exposed surface areas of sleeve device.

Briefly, FIG. 5 illustrates the internal components of the opto-electronic device 200 which are encapsulated within a molding material 224 such as epoxy, for example. These internal components include a semiconductor die 230 that rests upon a die attach pad 250. A heat sink 240 is thermally attached to the bottom surface of the die attach pad 250 such that the bottom surface of the heat sink 240 is exposed through the molding material on the bottom surface of the semiconductor package 210. Each of the bond pads (not shown) on the semiconductor die 230 are electrically connected to a respective electrical contact lead 215 through interconnecting wires 213. The optical module 220 is connected to the semiconductor die 230 through electric pathways 260. The electrical pathways 260 may be, for example, solder balls. Typically, the optical module includes optical detectors and transmitters, which allow the opto-electronic device 200 to serve as a transceiver. For further description of the opto-electronic package as illustrated in FIG. 5, refer to the above referenced U.S. application Ser. No. 09/568,094 ("Device and Method for Providing a True Semiconductor Die to External Fiber Optic Cable Connection").

In accordance with this aspect of the present invention, the upward facing surface 116 of the support shelf 120 is situated to extend substantially adjacent to the exposed bottom surface of the heat sink 240. The orientation of the heat sink 240 allows thermal coupling to the sleeve device 110, via the support shelf 120. By thermally connecting and mounting these adjacent components, the heat generated by the semiconductor package can be conducted and transferred through the heat sink and into the sleeve device 110. The sleeve device 110 consequently provides the opto-electronic device 200 with substantially greater ability to dissipate heat due to the large exposed surface area of the sleeve 1 10 relative to the heat sink 240. Moreover, by thermally bonding the support shelf 120 to the heat sink, which is typically provided by solder or the like, a stronger bond is formed between the sleeve device 110 and the opto-electronic device 200. This portion of the securing structure 101, thus, substantially prevents and relative translation or rotational movement therebetween. Other thermal bonding techniques may be applied, however.

Figure 6:
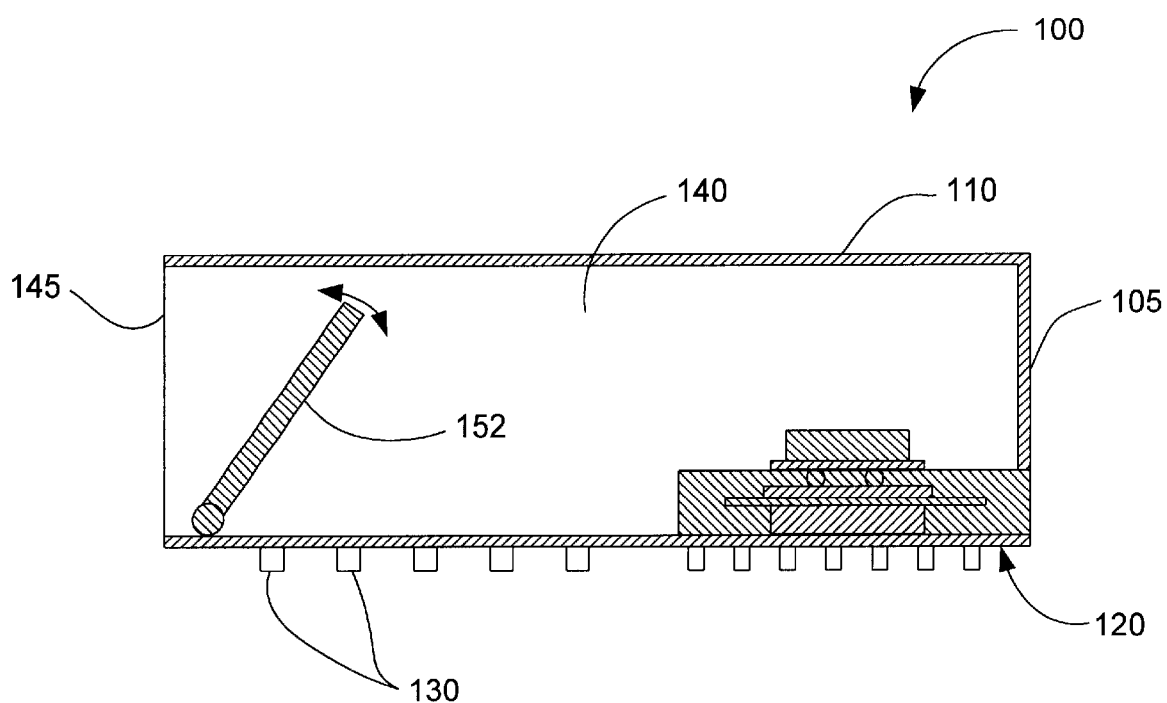
FIG. 6 illustrates an enlarged, side elevation view, in cross-section, of the opto-electronic module taken substantially along a vertical plane of the line 6—6 in FIG. 4.

Turning now to FIGS. 6 and 7, the transceiver assembly 100 may include a protective door 152 which pivots into socket 140 when an optical connector 150 is inserted through the cavity opening 145. Such a door 150 performs the functions of protecting the opto-electronic device 200 in the socket 140 from the environment when not be used.

In some embodiments, a conventional latch or peg 280 may be provided which protrudes into the interior of the socket 140 to lock the connector device 150 within the sleeve device 110. In yet additional alternative embodiments of the transceiver assembly 100, a liqueous filler material may be injected into the socket 140 to fill in the remaining voids between the optical fiber 155, the connector device 150, and the opto-electronic device 200. The solidified filler material adheres to surfaces to which it is in contact, thereby adding strength to the opto-electrical connections.

Figure 9:
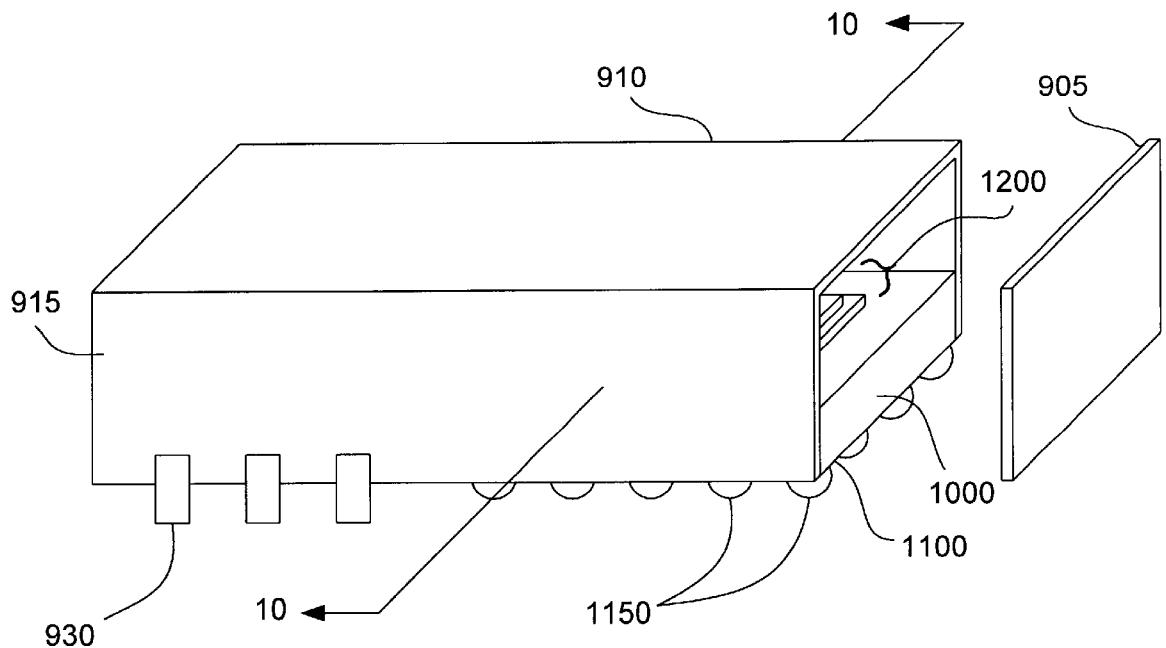
FIG. 9 illustrates a front perspective view of an alternative embodiment of the opto-electronic module of FIG. 2.

FIG. 9 illustrates a perspective view of an alternative embodiment of a sleeve device 910. This sleeve device 910 embodiment also secures both an opto-electronic device 1000 and a connector device so that an optical fiber may be connected with the opto-electronic device 1000. The semiconductor package 1100 of the opto-electronic device 1000 is a ball grid array (BGA) type package, i.e., a laminate BGA package. Since the solder bump electrical contacts 1150 are on the bottom surface of the package 1100, the sleeve device 910 secures the opto-electronic device 1000 through the connection between the sidewalls 915 of the sleeve device 910 and the side surfaces of the semiconductor package 1100. In order to receive the opto-electronic device 1000, an opening in the bottom surface of the sleeve device 910 is created and the device 1000 is then inserted into the opening. An adhesive material is applied between the sidewalls 915 and the package 1100 to secure the package 1100. For the illustrative purposes of showing the opto-electronic device 1000 within the sleeve device 910, a front panel 905 has been removed from the sleeve device 910. It is noted that the front panel 905 need not be removed from the sleeve device in order to insert the opto-electronic device 1000 into the sleeve device 910.

To connect the sleeve device 910 and the opto-electronic device 1000 to a printed circuit board, the mounting stems 930 of the sleeve device 910 are attached to the board and the solder bump contacts 1150 are connected to the input/output terminals of the board. The mounting stems 930 may be secured to the board with solder material or any appropriate adhesive material.

Figure 10:
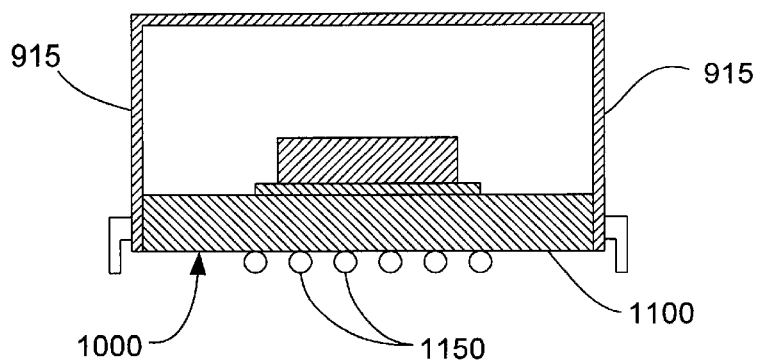
FIG. 10 illustrates a front elevation view, in cross-section, of the opto-electronic module taken substantially along a vertical plane of the line 10—10 in FIG. 9.

FIG. 10 is a cross-sectional view of the sleeve device of FIG. 9 along the vertical plane of the line 10—10 which illustrates contact between sidewalls 915 with the side surfaces of the semiconductor package 1100. It should be appreciated by those of ordinary skill in the art that the sleeve device of the present invention may secure a variety of opto-electronic devices by forming a bond with the devices such that they are firmly secured within the sleeve device.

Figure 11:
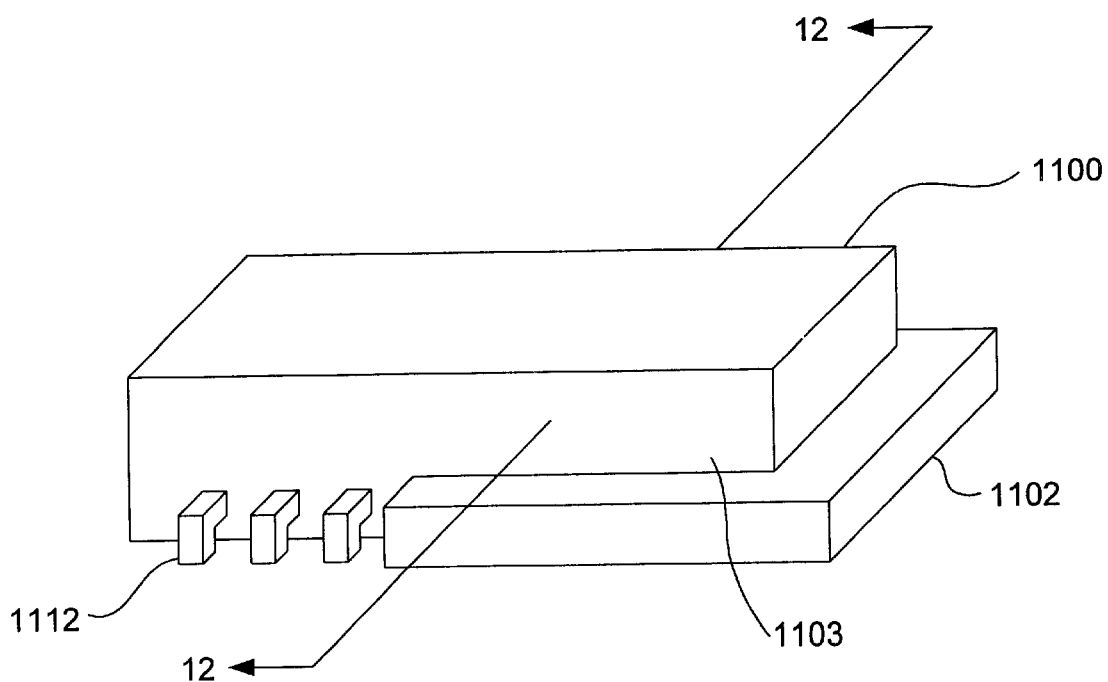
FIG. 11 illustrates a front perspective view of yet another alternative embodiment of an opto-electronic module.
Figure 12:
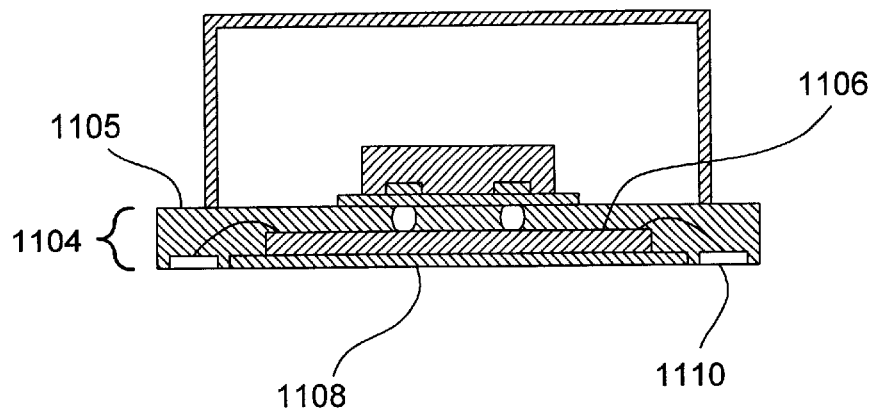
FIG. 12 illustrates a front elevation view, in cross-section, of the opto-electronic module taken substantially along a vertical plane of the line 12—12 in FIG. 11.

FIGS. 11 and 12 illustrate yet another alternative embodiment of the present invention in which a sleeve device 1100 secures an opto-electronic device 1102, where the semiconductor package of the opto-electronic device 1102 is a leadless leadframe semiconductor package 1104. In this embodiment, the opto-electronic device is secured through the connection between shoulder portions 1103 of the sleeve device 1100 and the semiconductor package 1104. Within the packaging material 1105 of the leadless leadframe semiconductor package 1104 is a die 1106 that is supported by a metal die attach pad 1108, and contact pads 1110 that are connected to the die 1106. Contact pads 1110 are exposed through the bottom surface of the packaging material 1105 and allow the die 1106 to be connected to an electronic substrate. The die attach pad 1108 is also exposed through the bottom surface of the packaging material 1105 such that upon mounting of the transceiver assembly to an electronic substrate, the die attach pad 1108 comes into contact with the substrate. The die attach pad 1108 thereby provides a thermal pathway to transfer heat from the opto-electronic device to the substrate.

In this embodiment of the transceiver assembly, the sleeve device 1100 has angled mounting stems 1112 that extend down approximately to the same level as the bottom surface of the semiconductor package 1104. These mounting stems 1112 allow the transceiver assembly to be mounted with a profile sufficiently low to allow the die attach pad 1108 to be in contact with a substrate. As is appreciated, the leadless leadframe package may also be various types of chip-scale packages.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

I claim:

1. A substrate mounted opto-electronic transceiver assembly for optically connecting an optical transmission device to an opto-electric receiver of a semiconductor package, said transceiver assembly comprising:
    a relatively rigid sleeve device having a securing structure adapted to rigidly mount to the semiconductor package in a manner substantially preventing relative movement therebetween, said sleeve device defining a socket sized for aligning receipt of the optical transmission device therein for optical coupling to the opto-electric receiver, said sleeve device being composed of a conductive material and which is thermally coupled to said semiconductor package in a manner dissipating heat through the sleeve device during operation of the semiconductor package; and
    a plurality of mounting elements cooperating with the sleeve device to mount the sleeve device and the semiconductor package to the substrate, as a unit.

2. The transceiver assembly according to claim 1, wherein said securing structure includes a support shelf having an upper surface rigidly coupled to a bottom surface of the semiconductor package for support thereatop.

3. The transceiver assembly according to claim 2, wherein said sleeve device includes a side wall upwardly depending from the support shelf, said side wall and the support shelf upper surface cooperating to define a receiving slot formed and dimensioned for receipt of the semiconductor package therein to position the support shelf upper surface under the semiconductor package bottom surface.

4. The transceiver assembly according to claim 3, wherein said side wall further including a shoulder portion defining an upper portion of said receiving slot, and oriented substantially adjacent a top surface of said semiconductor package when the package is positioned in said receiving slot.

5. The transceiver assembly according to claim 2, wherein said sleeve device includes a pair of opposed side walls each upwardly depending from opposite sides of the support shelf, each said side wall defining a respective receiving slot formed and dimensioned for receipt of the semiconductor package therein to position the support shelf upper surface under the semiconductor package bottom surface.

6. The transceiver assembly according to claim 5, wherein each said side wall further including a respective shoulder portion defining an upper portion of the corresponding receiving slot, each respective shoulder portion being oriented substantially adjacent a top surface of said semiconductor package when the package is positioned in the receiving slots.

7. The transceiver assembly according to claim 6, wherein said securing structure further includes an adhesive affixing the respective shoulder portions to the top surface of said semiconductor package.

8. The transceiver assembly according to claim 6, wherein said securing structure further includes an adhesive solder between the bottom surface of said support shelf and the bottom surface of said semiconductor package for the thermal coupling therebetween.

9. The transceiver assembly according to claim 7, wherein said securing structure includes a shoulder portion that is oriented substantially adjacent a top surface of said semiconductor package when said semiconductor package is mounted to the securing structure.

10. The transceiver assembly according to claim 9, wherein the semiconductor package is a chip scale package, the chip scale package having a die attach pad that is exposed on a bottom surface of the chip scale package, wherein upon mounting of the opto-electronic transceiver assembly to said substrate, the die attach pad becomes thermally coupled to said substrate.

11. The transceiver assembly according to claim 9, wherein the semiconductor package is a ball grid array package.

12. An opto-electric transceiver assembly for optically connecting an optical transmission device to an opto-electric receiver of a semiconductor package, said transceiver assembly comprising:

a relatively rigid sleeve device defining a socket sized for aligning receipt of the optical transmission device therein for optical coupling to the opto-electric receiver, said sleeve device including a bottom support shelf and a pair of opposed side walls each upwardly depending from opposite sides of the support shelf, each said side wall defining a respective receiving slot formed and dimensioned for receipt of the semiconductor package therein to position the support shelf upper surface under the semiconductor package bottom surface, said sleeve device being composed of a conductive material and which is thermally coupled to said semiconductor package in a manner dissipating heat through the sleeve device during operation of the semiconductor package; and a securing structure rigidly coupling the support shelf to a bottom surface of the semiconductor package for support thereatop.

13. The transceiver assembly according to claim 12, wherein each said side wall further including a respective shoulder portion defining an upper portion of the corresponding receiving slot, each respective shoulder portion being oriented substantially adjacent a top surface of said semiconductor package when the package is positioned in the receiving slots.

14. The transceiver assembly according to claim 13, wherein said securing structure further includes an adhesive affixing the respective shoulder portions to the top surface of said semiconductor package.

15. The transceiver assembly according to claim 14, therein the thermal coupling is provided by an adhesive solder between the upper surface of said support shelf and the bottom surface of said semiconductor package.

16. The transceiver assembly according to claim 15, wherein the thermal coupling is provided by an adhesive solder between the bottom surface of said support shelf and the bottom surface of said semiconductor package.

17. An opto-electronic connection system comprising:

an opto-electronic device that includes,
electrical contact leads,
a packaged semiconductor device that has a semiconductor die, the semiconductor die being in electrical contact with the electrical contact leads; and
an optical device that is attached to the packaged semiconductor device; and a relatively rigid sleeve device having a slot sized for receipt of the opto-electronic device, the slot adapted to secure the opto-electronic device such that relative movement between the sleeve device and the opto-electronic device is substantially prevented.

18. The connection system as recited in claim 17 wherein the slot of the sleeve device further comprises a support shelf having an upper surface that is fixedly attached to a bottom surface of the packaged semiconductor device.

19. The connection system as recited in claim 18 wherein the slot of the sleeve device further comprises a shoulder portion, the shoulder portion oriented substantially adjacent a top surface of said packaged semiconductor device when the opto-electronic device is positioned in the slot.

20. The connection system as recited in claim 18 wherein the opto-electronic device further includes a heat sink that is thermally coupled to the upper surface of the support shelf.

21. The connection assembly as recited in claim 17 wherein the sleeve device further comprises mounting stems, the mounting stems and the electrical contact leads of the opto-electronic device being fixedly attached to a printed circuit board.

22. The connection system as recited in claim 17 wherein the sleeve device further comprises a socket.

23. The connection system as recited in claim 22 further comprising:

a connector device configured to fixedly support an optic fiber, the connector device being inserted within the socket of the sleeve device such that the optical fiber is optically connected to the optical device.

24. The connection system as recited in claim 23 further comprising filler material that fills the remaining space within the socket after the connector device and the optic fiber are inserted into the socket.

* * * * *